United States Patent

Weller

[15] 3,689,873
[45] Sept. 5, 1972

[54] DIRECTIONAL FILTERING OF SEISMIC DATA

[72] Inventor: Charles E. Weller, Houston, Tex. 77024

[73] Assignee: Shell Oil Company, New York, N.Y.

[22] Filed: Dec. 27, 1968

[21] Appl. No.: 787,450

[52] U.S. Cl.......340/15.5 TD, 340/15.5 R, 340/15.5 DP, 340/15.5 TC, 340/15.5 AF
[51] Int. Cl. ............................................. G01v 1/28
[58] Field of Search.340/15.5 MC, 15.5 TC, 15.5 DP

[56] References Cited

UNITED STATES PATENTS

3,346,068   10/1967   Woods et al..............340/15.5

Primary Examiner—Benjamin A. Borchelt
Assistant Examiner—H. A. Birmiel
Attorney—Freling E. Baker and John H. McCarthy

[57] ABSTRACT

A method of classifying seismic events according to their direction of arrival by a process equivalent to the focusing and detecting of events by a lenticular array of transmitters and an array of detectors located on the focal surface of the lens. Each plane wave front caused by an event will converge at a detector on the focal surface whose position indicates the direction of arrival of the seismic event.

13 Claims, 7 Drawing Figures

INVENTOR:
C. E. WELLER
BY: A. H. McCarthy
HIS AGENT

INVENTOR:
C. E. WELLER

FIG. 7

DIRECTIONAL FILTERING OF SEISMIC DATA

BACKGROUND OF THE INVENTION

This invention relates to filtering seismic data, and more particularly, to a method of classifying seismic events according to their direction of arrival at an array of seismic receiving stations and in effect, viewing a subsurface region from different vantage points.

The seismic method of exploring for oil developed after the turn of the century when scientists began to apply known methods of physics and other basic sciences to the problems associated with finding oil. In particular the principles worked out by earthquake seismologists to study the earth's interior were found to be helpful.

Earthquakes are known to cause elastic waves to travel through the earth at a characteristic speed of propagation. Each type of rock or rock formation has a velocity of propagation of elastic waves associated with it. And when a wave traveling through one kind of rock, for instance, sand, comes to a boundary with another kind of rock with a different velocity of propagation, such as limestone, part of the elastic wave is reflected in a way similar to the way light is reflected from a semi-transparent mirror. This reflection phenomenon is the basis for the reflection method of seismic exploration. The part of the incident wave that is not reflected passes through the boundary but has its direction of travel changed in the process, and will in part be reflected from deeper lying boundaries.

Seismic waves are generated by dynamite, vibrators, or other sources of acoustic energy positioned near the earth's surface and travel down into the earth in all directions changing speed and direction as they encounter different underground rock boundaries. The part of the energy in the seismic wave that is reflected back toward the surface by the boundaries are called reflections and can yield significant information about the geologic structures within the earth.

Seismic reflections are detected at the surface by seismic receivers, such as geophones or hydraphones, that convert acoustic energy to a time varying electrical signal whose amplitude is related to the amplitude of ground motion. When amplified and recorded on photographic film, the signal takes on the appearance of a wiggly line containing blips that represent the arrival of a seismic reflection (often called a seismic event) at the receiver.

The wiggly lines are known as data traces, of course, the signals may be recorded on magnetic tape, either in analog or digital form, as well as on film.

Typically many seismic receivers are set out in a pattern, called an array, with one or more receivers representing one element or receiving station in the array. The outputs of the receiving stations, the seismic data traces, can be thought of as a set of time varying signals, with one signal representing an element of a set. Actually each seismic data trace usually represents the output of a group of receivers connected together and so spaced to cancel unwanted horizontally traveling waves.

After recording, the data must be put into a readily interpretable form, such as a section, and it must be interpreted. Interpretation of seismic data, however, is a very difficult task, for, not only are there large amounts of ground noise scrambled into the record, but also the seismic events arrive at array in very complex patterns. Specifically, whether or not the seismic events are arriving from the same or different underground directions is exceedingly difficult to detect. Indeed, the direction of arrival of a given reflection is impossible to determine with conventional techniques. Yet, it would be of considerable value to geophysicists if they were able to accurately and consistently classify seismic events according to their direction of arrival. Such a capability could improve the signal to noise ratio, increase the accuracy of locating underground seismic reflectors, and reduce the number of shots necessary to map a region. It is therefore one major objective of this invention to provide a method of processing seismic data so as to classify seismic events according to their direction of arrival.

Of course, the information necessary to perform spatial filtering, i.e., the ability to emphasize or attenuate seismic events according to their direction of arrival, must be present in the seismic data. However, that information is always present whenever the output of each geophone station in an areally extensive surface array is individually recorded. Since the array is spread out over some surface area of the subsurface region to be explored, wave fronts arriving from any other direction than straight down are apt to reach the individual stations of the array at different times. Thus, there will be a definite phase relationship among the individual geophone outputs. Furthermore, there will be a particular phase relationship in the recorded events pertaining to a particular wave front. The problem is to untangle the phase information from the other data and noise.

SUMMARY OF THE INVENTION

This problem is effectively and uniquely solved by a method of processing the data that starts by selecting a predetermined subset of seismic data traces. Next the subsurface region is conceptually divided into a plurality of sectors. Then data from each input trace of the subset is either continuously, or on a sampled basis, spatially filtered so that each seismic event that has originated in a given subsurface sector is migrated to its place of origin.

According to one aspect of carrying out the method of the invention, seismic events are spatially filtered by an electro-acoustical analog (ELAN) filter. In analog form, the ELAN filter consists of a generally semi-circular array of transmitters, that has the focal property of a lens and represents a one-to-one mapping of the receiving array used in the field, and an array of microphones located on the focal curve of the lens. When attenuate transmitters are excited by a $\Delta t$-corrected, i.e., move-out corrected, seismic record, each emerging wavefront caused by a flat or dipped event converges at a point on the focal curve. Each microphone therefore responds only to energy that had arrived at the array from within a narrow range of directions. Thus phased events are classified according to their direction of arrival. By forming a weighted sum, or composite, of these outputs, it is possible to emphasize or atenuate seismic signals arriving from any desired direction.

BRIEF DESCRIPTION OF THE DRAWINGS

Further objects and a better understanding of this invention can be had from the following description taken in conjunction with the drawing in which.

Figure 1:
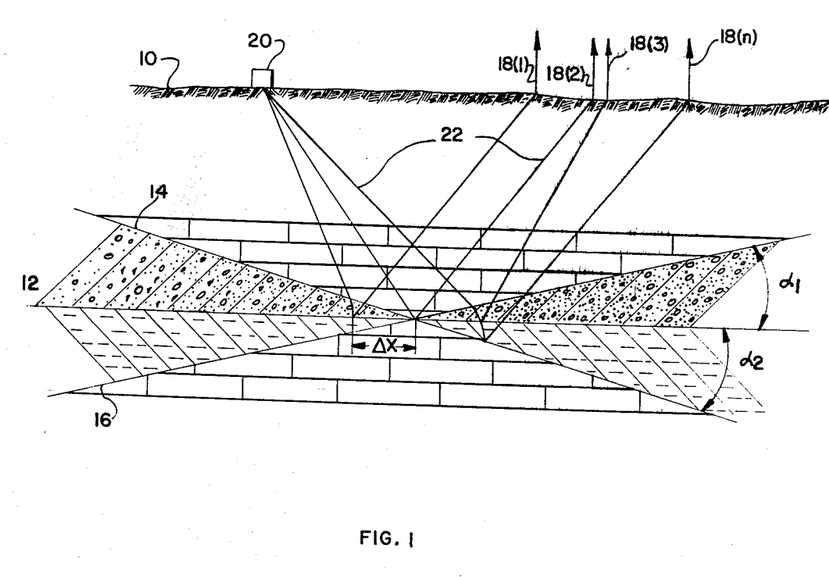
FIG. 1 is a view in cross-section of a hypothetical underground rock formation that will be assumed for the sake of describing the invention

FIG. 1 shows in cross-section an underground rock formation where the surface of the earth is depicted by line 10. Three reflecting interfaces 12, 14, and 16 are illustrated and will be referred to as reflectors or reflecting surfaces hereafter. Reflector 12 is horizontal while reflectors 14 and 16 are at an angle $\alpha$ to the horizontal. An array of geophones 18a through n and a seismic energy source 20 are shown on the surface of the earth 10. Several typical wave rays 22 are shown to illustrate how seismic waves originating at source 20 might travel and be reflected from the various reflectors to the geophone array.

FIG. 1 is illustrated in 2 dimensions and geophone array 18 is shown as a line array to make the concepts of the invention easier to understand. The same approach will be followed throughout the description of the invention. However, it should be specifically pointed out that the invention includes the 3 dimensional case. For example, array 18 could be a two dimensional surface array as a line array, reflectors 12, 14 and 16 could be planes; etc.

Figure 2:
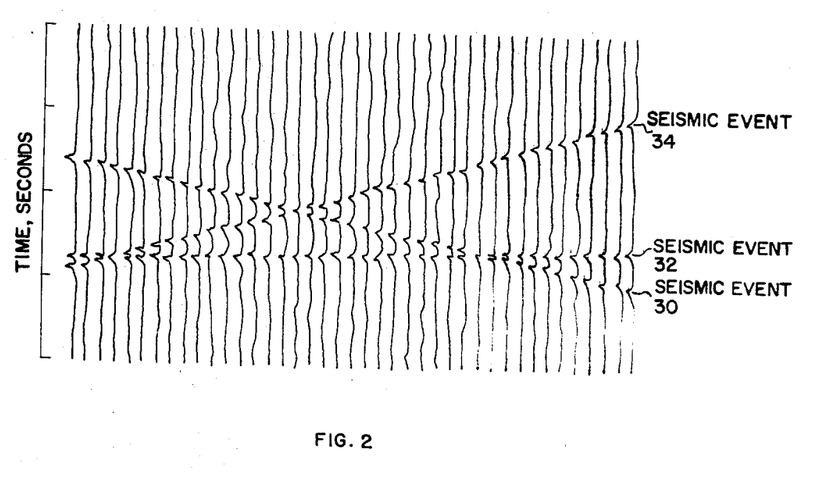
FIG. 2 is a $\Delta t$-corrected time section in single velocity environment.

FIG. 2 shows the output traces for geophones 18($l$) through 18($n$) after $\Delta t$ correction and illustrates the phase relationship between seismic events at individual geophones caused by reflectors 12, 14 and 16. The high amplitude blips on each trace indicate a seismic event; that is they indicate when a reflected wave arrived at that geophone.

Seismic event 30 consists of the blips traversing from the upper left to lower right in FIG. 2 and is associated with reflector 14 of FIG. 1. Seismic event 32 consists of the blips running horizontally across FIG. 2 and is associated with reflector 12 of FIG. 1. And finally, seismic event 34 consists of the blips running from upper right to lower left in FIG. 2 and is associated with reflector 16 or FIG. 1.

It will be noted that the geometry of seismic events 30, 32 and 34 does not accurately represent the true geometry of the rock formations. This difference, although understandable and predictable from the paths followed by the acoustic rays, must nonetheless be compensated for. The present invention is an aid in performing the compensating operations.

Figure 3:
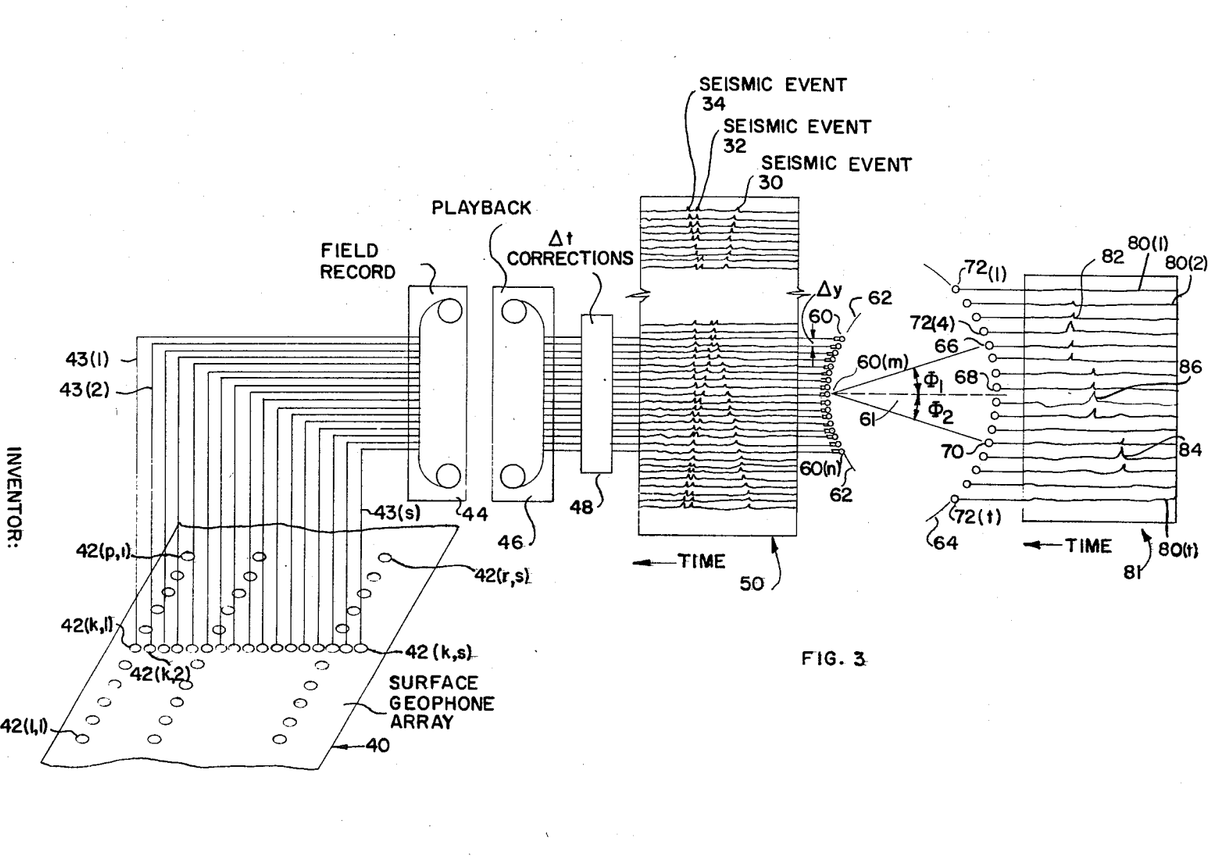
FIG. 3 is a diagram illustrating the flow of seismic data from the geophone array to the output of the ELAN filter.

Turning now to FIG. 3, there is shown a generalized 2-dimensional geophone array 40 with $r \times s$ individual geophones or geophone groups planted in r rows and s columns, but the array is only partially shown for the sake of clarity. Again, only the 2-dimensional case will be discussed, it being understood that the 3-dimensional case can be easily extrapolated therefrom. The array 40 may be of any size or geometrical configuration, a rectangular array being illustrated here.

In the 2-dimensional case, the outputs of geophones 42($k,l$)–($k,s$) are recorded on s separate tracks by a field recorder 44 which may, for example, be of the magnetic tape type. Lines 43($l$)–($s$) represent electrical conductors interconnecting the geophones and recorder. The seismic data when so recorded may be processed immediately in the field or taken to a remote location for later processing.

A playback device 46 having at least s channels is used to convert the recorded data back to s separate electrical signals. If the data were stored on magnetic tape, playback device 46 could consist of a tape drive system with s read heads.

From playback device 46 the data transmitted to a processor 48 for performing $\Delta t$ corrections thereon. Methods and apparatus for performing $\Delta t$ corrections are well known so that the $\Delta t$ correction function is indicated only by black box 48.

The method of the invention may be carried out by analog or digital equipment.

In the analog case the $\Delta t$ corrected data consists of 1 through n analog electrical signals whose wave forms would appear as in FIG. 2 and which have been reproduced for the sake of illustration at 50. From the output of processor 48, the $\Delta t$ corrected data is transmitted to an array of electrical to acoustical transducers 60($l$) through 60($n$) that are arranged on a curved surface 62 having a focal surface 64. The only constraints on surface 62 are that it have a focal point or focal surface as commonly understood in optics, and for example it may be a paraboloid or part of a sphere.

The purpose of array 60($l$)–($n$) is to focus phased seismic events at a point that is related to the direction of arrival of the original seismic events at the geophone array. The phase relationship of the wave fronts incident on the geophones have, of course, been preserved in the recorded data. This relationship is illustrated at 50 where the $\Delta t$ corrected seismic events 30, 32 and 34 can for purposes of illustration be considered as equivalent to wave fronts incident upon the geophone array. All of the signals in seismic event 32 will excite transducers 60($l$)–60($n$) at substantially the same time so that the acoustical wave fronts transmitted therefrom will tend to focus at a point equidistant from all of the transducers. For example, the energy of seismic event 32 will be focused at focal point 68. For events that excite the transducer array in a different phase sequence, the focal point will be at a different spot on focal surface 64. For example, seismic event 34 will focus at focal point 66 that is some angle $\phi$ away from the axis of symmetry 61 of the curved surface 62. Similarly seismic event 30 will be focused at point 70.

The wave fronts focused at the various focal points such as 66, 68 and 70 represent substantially all of the energy from all of the traces that arrived at the geophone array from a given direction or sector of the underground region. Thus, all of the seismic energy arriving from a particular direction is concentrated by the present invention at a single point, and the angle that the point makes with respect to the vertical is automatically known. The angle that focal points 66 and 70 make $\phi_1$ horizontal, $\phi_1$ and $\phi_2$ respectively, are mathematically related to the dip angle $\alpha$ which the reflectors make with the horizontal in the earth by the following expression, for constant propagation velocities $V_1$ and $V_E$:

$$\sin \alpha = \frac{1}{2} \frac{V_1}{V_E} \frac{\Delta y}{\Delta x} \sin \phi$$

where $V_1$ = velocity of seismic waves in the earth
$V_E$ = velocity of waves in the ELAN medium
$\Delta y$ = vertical distance between adjacent transducers 60
$\Delta x$ = distance between two consecutive subsurface reflection points covered by the geophone spread Thus by knowing the parameters, $V_E$, $V_1$, $\Delta x$, and $\Delta y$, it is possible to relate ELAN angle $\phi$ to the actual dip angle $\alpha$ of the geology.

The acoustical waves, having been focused at a point on focal surface 64, are detected by an array of detectors 72(1)–72(t) on surface 64 which may, for example, be microphones where $t$ represents the total number of microphones in array 72. In essence then, there are $t$ output signals from the ELAN system. Each output signal is associated with a specific direction of arrival of seismic events at the geophone array and will thus contain nearly all of the seismic energy associated with a plane wave arriving from a particular sector of the underground region being explored. In this way, the underground region is spatially divided into a plurality of sectors. Consequently, each sector may be seismically examined merely by examining the output signal from the ELAN microphone associated with that sector. The number of detectors, $t$ may be larger or smaller than the number of transmitting transducers 60. Of course, the resolving power of the system will improve as the number of detectors is increased.

In practice, there are a very large number of seismic traces to be processed. But the number of inputs of the ELAN system is limited. It is therefore often necessary to subdivide the seismic traces into batches for processing. In fact, it is often advantageous to spatially filter the data in small batches or subsets. In this way, a particular subsurface region may be examined from several surface angles and consequently be mapped more precisely than was heretofore possible. For example, a region directly under a first sub-array may be examined looking directly down into the earth. But to add additional detail and to resolve any ambiguity, it is also possible to examine the same region by looking at the waves received from that region by some other sub-array some distance from the first.

In processing each batch of input signals, it has been found that best results are achieved if a substantial amount of overlap is used. For example, if batches of $j$ traces are used, an overlap of $J-1$ is excellent. That is, a trace is deleted from one end of the ELAN input batch and a new trace is added at the other end. In this way, each trace will be the center trace in exciting the ELAN transducers on one run and each trace in a given batch will excite every ELAN transducer. With respect to FIG. 3, this means that a given trace will be run first in position 60(1). Then it will be run in position 60(2), and so on until it has been run in 60(n). It is as if the signals illustrated at 50 were on a sheet of tape, and the signals were stepped through the ELAN by advancing the tape. Each signal retains its relative position with respect to each other signal and is processed once from each ELAN input position.

An overlap of $n-2$ has also been used and found successful. However, the quality of the processed seismic data is degraded as the amount of overlap is decreased.

Of course, the ELAN system is not the only apparatus available for carrying out the method of the present invention. A practical alternative apparatus, particularly for digitized seismic data, is a digital computer programmed to simulate the ELAN system.

In order to fully understand how the method of the present invention can be carried out by digital computer, it is helpful to appreciate the physical phenomena involved in the focusing effect.

Focusing in its most elemental form amounts to no more than the summing of wave propagated energy at some point. It is known, of course, that waves in a homogeneous medium spread out from a point source as expanding spheres. And Hugen's principle states that every point on a wave front is the source of a new wave that travels out from it in spheres also. Thus, waves from several points in space will necessarily interact with each other. If at the point of interaction, the waves are in phase, the energy therein will add. Focusing is no more than this phenomenon applied to many wave fronts. With regard to the ELAN system of FIG. 3, plane wave fronts emitted from transducers 60(1) through 60(n) will focus at some point on curve 64. This is true because the amount of time it takes for a wave to travel from each transducer to a point is identically the same. Thus, all waves will arrive at the point in phase and all the energy in the waves arriving at that point will add. The point is that in order for a focusing phenomena to occur, a plurality of wave fronts must reach a particular point in space where the focusing is to take place at precisely the same moment. Normally wave fronts interacting with each other do so in a more or less random manner and thus the wave energy tends to cancel and average out to some nominal value.

With respect to performing the ELAN processing on the digital computer, the focusing phenomenon may be conceptualized by imagining, if you will, a focal curve such as 64 in FIG. 3 and a focusing lens such as 62 in FIG. 3. It takes a wave a certain amount of time to travel from each transducer 60 to point 72. It will take longer for a wave front from transducer 60(n) to reach point 72(1) than it will a wave front from 60(1). Thus, in order for a wave front from 60(n) to arrive at point 72(1) at the same time that a wave front from 60(1) does, it is necessary that the wave front from transducer 60(1) be delayed before summing. This time delay is equal to the difference in the amount of time it takes a wave to travel from 60(n) to 72(1) and the amount of time it takes a wave to travel from 60(1) to 72(1). The same reasoning, of course, applies to all other transducer locations and all other focal point locations. With this in mind then, the next step is to calculate the various delays required for each transducer 60 with respect to each focal point 72.

For n transmitters and t receivers n x t delays are precalculated.

The reasoning involved in calculating the time delays may be explained as follows. Each focal point 72 will have a transducer that is physically the closest thereto. The time it takes a wave to travel from the nearest transducer to the focal point of interest is used as the base time for that particular focal point. It will take waves from all other transducers some longer time to reach that same focal point. The excess time for each transducer is calculated and used to adjust that respective transducer input signal. Adjusted transducer input signals are then summed. The procedure is then repeated for each focal point. The results may then be converted back to analog form and displayed.

It is important to note that the ELAN and the digital computer are merely two alternative apparatus for carrying out the method of this invention. Both apparatus are capable of focusing plane waves at a point related to their direction of arrival. In the case of the ELAN, the focusing is done in analog form by the shape of the lens. In the case of the computer, the focusing of a lens is simulated by calculating the time delays required for bringing the geophone output signals into phase alignment at a particular angle of emergence from the earth and summing the delayed signals. Of course, this operation must be performed for each emergence angle of interest. If the computer were strictly simulating the ELAN, a set of focusing time delays would be calculated for each detector position.

Figure 4:
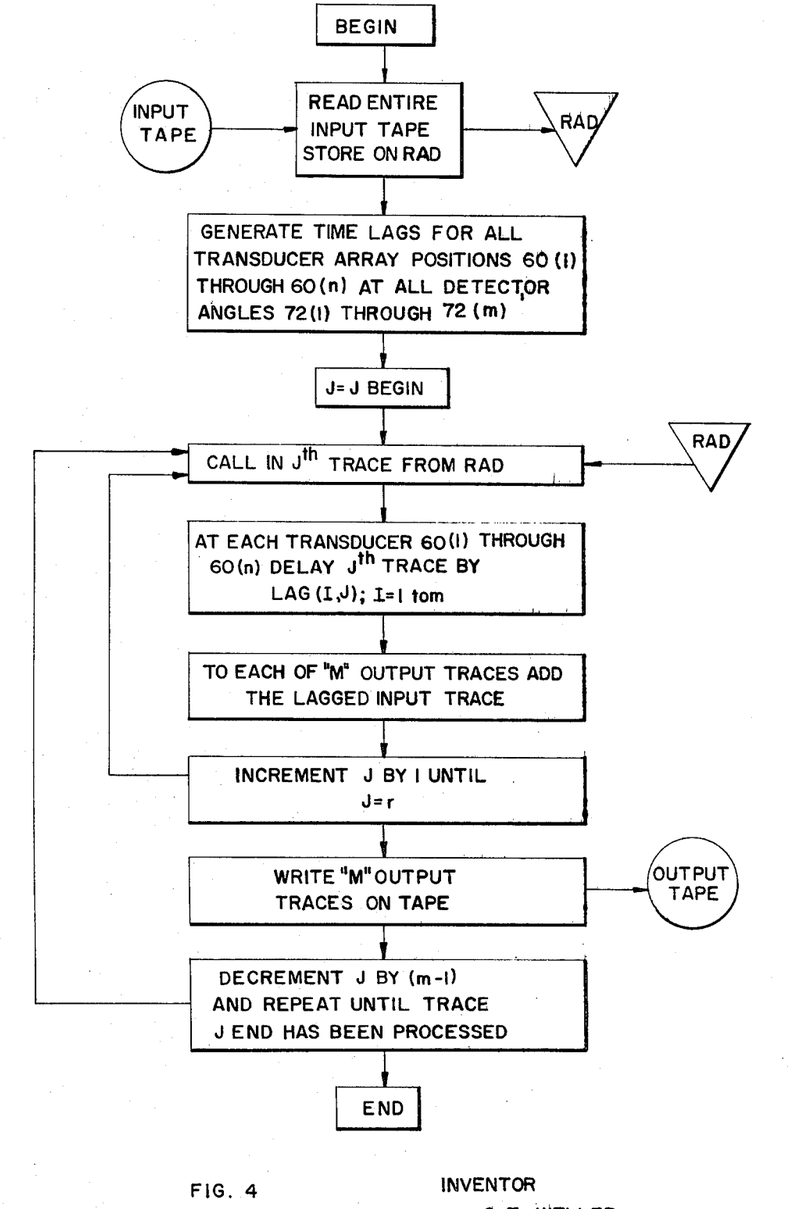
FIG. 4 is a flow chart of a general purpose computer program for performing the spatial filtering operations of the invention.

FIG. 4 illustrates a flow chart of a general purpose computer program that may be used to carry out the above-discussed method. As can be seen, the program is basically a delay and sum scheme in accordance with the principles discussed above. The input tape contains move-out corrected (i.e. $\Delta t$ corrected) seismic traces from the geophone array. The information is in digital form and is read directly from the tape into a very large, high-speed random access memory device, abbreviated RAD. A program then goes through the tedious operation of calculating and generating the time delays for all transducer array positions $60(l)$ through $60(n)$ for all detector angles $72(l)$ through $72(t)$. Then the computer goes through each trace one at a time and delays it for each delay previously calculated. It, of course, keeps track of each delayed trace and correlates them such that each of the traces in a batch, properly delayed to be in phase alignment at a particular detector, are summed together as discussed above. In this way signals representing plane seismic events will coincide in time and their energies will add. For each input batch of n traces a batch of t output traces will be produced. The output will generally be in digital format and on magnetic tape. Each of the $t$ output traces represents energy reaching the surface within a relatively narrow range of angles. Thus, the output of the program is a spatially filtered set of signals that can be further processed, e.g., by merely summing the data at certain selected angles and thus performing a velocity filtering operation or by migrating the data to its proper $(X,t)$ or $(X,Z)$ position.

The output of both the computer and the ELAN is a batch of signals $80(l)$ through $80(t)$ which would appear on a display 81 such as an oscilloscope or strip chart recorder. Because of the unique focusing effect described above, each signal in batch 80 is associated with a sector of the underground region and will contain a substantial portion of the seismi energy emanating from that region. Thus by emphasizing or attenuating various signals in batch 80, spatial filtering is achieved.

With the seismic information in the spatially filtered form as described above, it is possible to perform migration operations in an improved manner.

Figure 5:
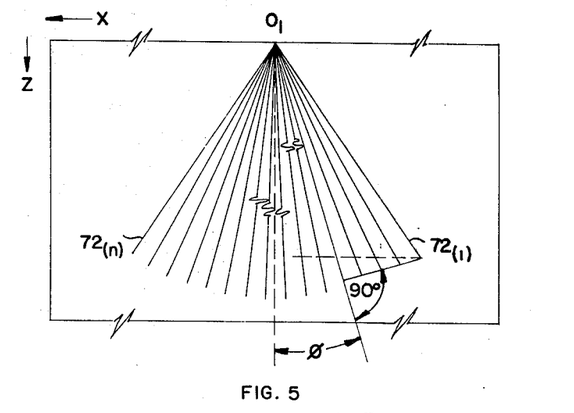
FIG. 5 is a diagram illustrating the method of migration.

Referring now to FIG. 5, there is shown a display consisting of an X–Z plane where the X axis represents the shot-geophone line of the input batch and the Z axis represents subsurface depth. The Z dimension may also be time rather than distance since each is convertible to the other. Originating point $O_1$ represents the mid-point of the geophone sub-array from which the batch of input traces was taken. An originating point $O_2$ (not shown) would represent the mid-point of an overlapping geophone sub-array.

To perform migration, a given batch of the ELAN output traces, in amplitude-distance coordinates, is radially laid out at the proper dip angles in the X–Z plane in such a manner that the originating point $O_1$ of the radial lines, as defined earlier, represents the midpoint of the sub-array from which the ELAN input batch originated. For a single-velocity model this scheme is illustrated in FIG. 5, where, for example, the output of microphone 66 (in FIG. 3) located at an angle $\phi_1$ with respect to the ELAN array, is placed in the X–Z plane at the corresponding angle $\alpha$ with respect to the Z axis. For a multilayer-velocity model the initial angle $\alpha$ for a given trace is still defined in the same manner, but at each velocity interface the ray direction is changed. The new angle is obtained by using Snell's law.

Figure 6:
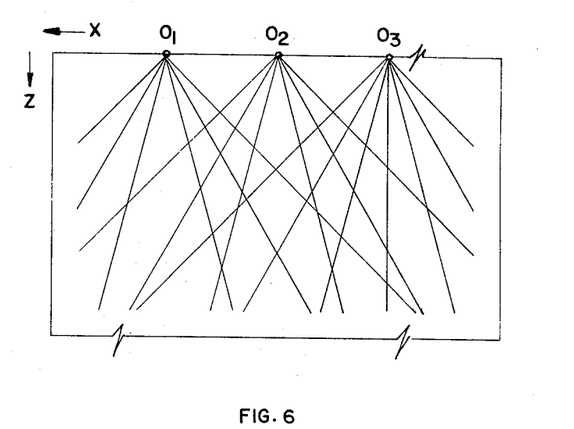
FIG. 6 is a diagram illustrating the method of compositing.

Compositing of the migrated data is illustrated in FIG. 6 for the single velocity case where the X–Z plane and originating points are as previously defined. For each originating point, $O_1$, $O_2$, etc., the ELAN output traces are radially laid out as described above. In this way, the "view" of a reflecting surface from many directions is combined to form a more accurate picture of the underground geology.

In the digital processing scheme for the above compositing method, the X–Z plane is divided into a grid of rectangular cells having dimensions $\Delta X$ by $\Delta Z$, where $\Delta X$ is the distance between two consecutive subsurface points of the input traces and where $\Delta Z$ is the product of the digital sampling interval of the amplitude-time data and the acoustic velocity in the subsurface medium at the (X,Z) position of the cell. Initially each cell is assigned the value zero. As described in the above paragraph, the ELAN output traces are placed radially in the X–Z plane, and the (X,Z) coordinate position for each sample of these traces is computed. The cell enclosing the (X,Z) coordinate position of a given sample is then assigned the value of the sample. Whenever two or more samples from the same trace fall in the same cell, their average value is assigned to this cell. Whenever two or more traces from different originating points, $O_1$, $O_2$, $O_3$, etc., as shown in FIG. 6, intersect in a given cell, their overlapping outputs are added within that cell. Typically, the originating point is moved by one trace from one batch to the next; hence, for generating a composited section there were as many originating points used as there were input traces.

Figure 7:
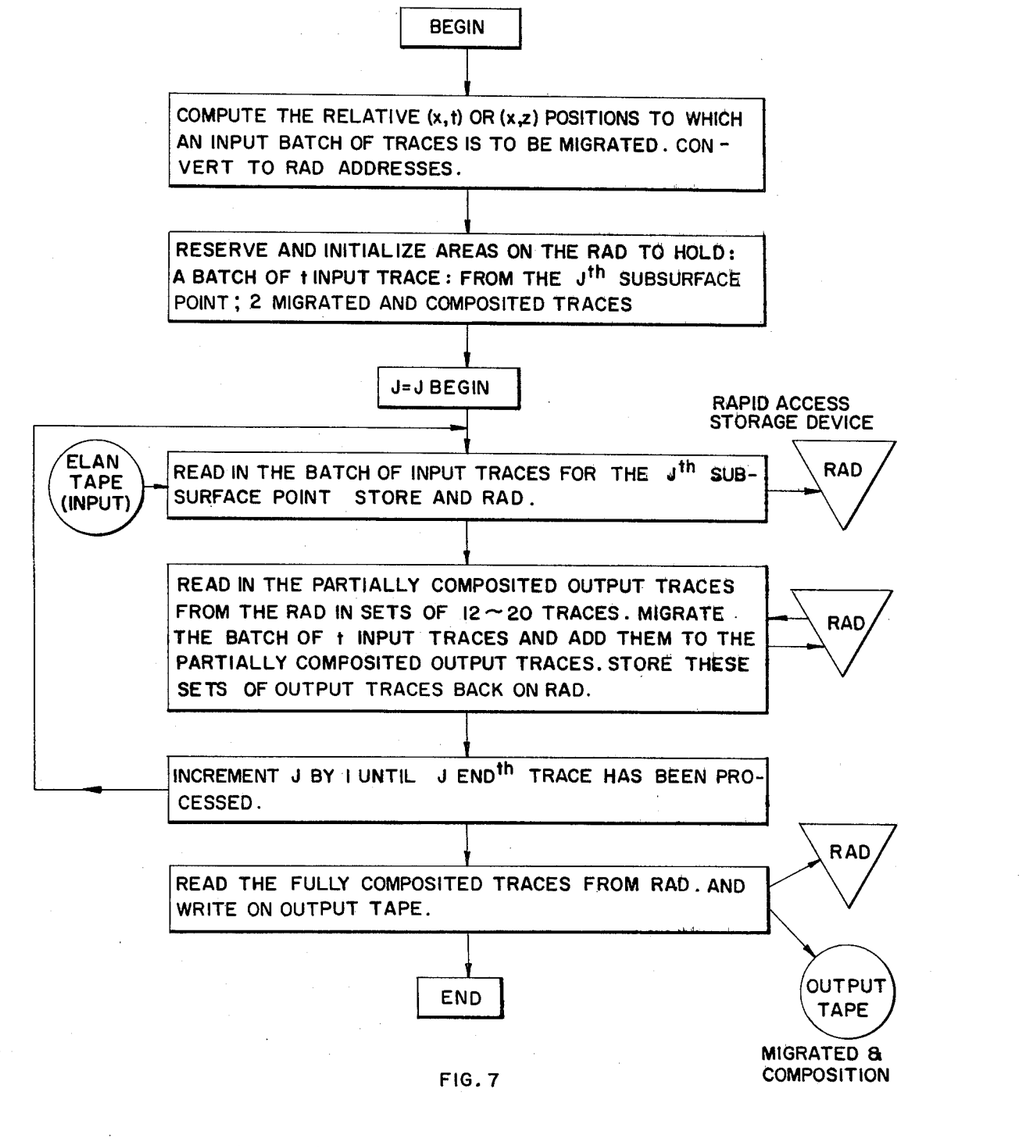
FIG. 7 is a flow diagram of a general purpose computer program for performing the migration and compositing operations of the invention.

For performing the above operation, refer to FIG. 7 which is a flow diagram of a general purpose computer program that may be used to perform this aspect of the method of the present invention. The migration program uses the output tape from the method flow-charted in FIG. 4 as its input. Again, the basic idea is to use the information about the direction of arrival of seismic energy as a basis for retracing the seismic wave paths from the earth's surface back down to a point on the reflector from which they were reflected. This technique is known as ray tracing and through its use, a picture of the underground geological formations is developed by or through a point-by-point positioning of the seismic data in its proper position in the (X,t) or (X,Z) plane. The program, of course, makes use of the formula developed early in the application for migrating a point from its apparent position to its proper position. Furthermore, the technique of dividing a seismic section into a grid of rectangular cells of dimension $\Delta X$ by $\Delta Z$, as described earlier, is utilized. Knowing the direction of arrival of a ray and its velocity, it can be determined into which $\Delta X$-$\Delta Z$ cell a particular event will fall. In the computer, an addressable storage location is assigned to each cell, and the quantitative value of any seismic event happening in a particular cell is added into the assigned location in memory.

The flow chart of FIG. 7 also performs a compositing function since it effectively incorporates all of the data from the many input batches into a single, composited, picture of the underground structure, as illustrated in FIG. 6.

The compositing of the ELAN output traces is rather simple when velocity filtering without migration is desired. Each batch of these output traces is summed point-by-point in time, and the resulting trace is positioned vertically below the position $0_1$. The composited section so obtained has one-to-one correspondence with the input section. By properly choosing the ELAN receiver positions, one can enhance the seismic energy from certain directions as compared to others; in this sense ELAN serves as a velocity filter.

A further advantage of the present invention can be found in its enhancement of the signal-to-noise ratio. Because the present invention effectively focuses all of the energy from all of the geophone outputs associated with a seismic event, the effect is to dramatically increase the signal-to-noise ratio from that event. This fact is illustrated at 80 in (FIG. 3) where it can be seen that blips 82, 84, and 86 contain nearly all of the energy in seismic events 84, 30, and 32 respectively, and have a significantly higher amplitude than the ambient noise. Thus the method of the invention provides an effective means of improving the signal-to-noise ratio and indeed may be used for that function only.

Where the velocity profile is not precisely known, the directional information obtained from the present invention may be used in an iterative scheme to pin down the velocity profile. More specifically, a velocity profile is first estimated. Then the X-Z plots of ELAN outputs looking at an event from different angles are superimposed or summed. If the events reinforce, the velocity estimate was correct. If the events don't reinforce, try another velocity profile.

I claim as my invention:

1. In a method of processing a set of signals taken from a geophone array positioned above a seismically reflective subsurface structure, the steps comprising:
   selecting a batch of input signals, said batch of input signals being a subset of said set of signals;
   focusing said batch of input signals so that substantially all of the signal energy of a plane wave event present in said batch of signals will be in phase at some angle $\phi$, said angle being related to the angle at which said plane wave event emerges from said subsurface structure at said geophone array;
   generating a batch of output signals, each of said output signals being associated with a particular direction of arrival of seismic waves at said geophone array and comprising the sum of signal energy focused from plane wave events arriving from said direction, whereby said angle $\phi$ is indicated by a relatively large concentration of signal energy in one of said output signals.

2. The method of claim 1 wherein said subset of seismic signals is associated with geophones in said geophone array lying in a substantially straight line.

3. The method of claim 1 further characterized by the steps of:
   modifying said first batch of input signals to form a second batch of input signals, said second batch of input signals consisting of the outputs of some predetermined subset of said set of seismic signals, a substantial number of whose elements overlap said first subset; and
   repeating the method until all elements of said set of seismic signals have been processed a substantially equal number of times.

4. The method of claim 1 further characterized by a step of summing said batch of output signals to form a non-migrated composited output.

5. The method of claim 4 further characterized by the step of displaying said summed batch of output signals.

6. The method of claim 3 further characterized by the steps of:
   generating a batch of output signals for each set of input signals, each output signal of said batch of output signals being related to an angle, at which said batch of seismic signals can be found; and
   displaying said batches of output signals.

7. The method of claim 3 further characterized by the steps of:
   projecting each signal of each of said batch of output signals downwardly from their respective originating points at an angle, $\alpha = \arcsin$
   $$\frac{1}{2} \frac{V}{V_E} \frac{\Delta Y}{\Delta X} \sin \phi$$
   displaying said projected signals.

8. In a method of processing seismic data traces obtained from seismic receiving stations located above seismically reflective subterranean structures, the steps comprising:
   correcting a selected batch of such seismic data traces to provide move-out corrected traces;

focusing the data contained in the batch of move-out corrected traces by producing quantities related to acoustic waves that propagate through a homogenous medium from points dispersed along a curve in a 1 to 1 mapping of the disposition of the receiving stations from which the seismic data traces were obtained;

dividing the focal plane of said curve into a plurality of sectors so that each sector is related to a selected volume within the subsurface region from which the seismic data traces were obtained;

summing focused data that appears in each of said sectors by producing a quantity related to the sum of acoustic energy that propagates from the points along said curve to each sector; and producing output signals related to the quantity summed in each of said sectors so that each output signal is related to seismic energy that is reflected along a ray path extending from the center of the array of seismic receiving stations to a selected volume within the subsurface region.

9. A system for processing seismic data, which comprises:

move-out correcting means for applying move-out correction to seismic data traces from an array of seismic receiving stations;

an array of elastic wave transmitting means distributed along a curve in a one-to-one mapping of the distribution of said seismic receiving stations, for transmitting elastic waves corresponding to said move-out corrected seismic data traces;

an array of elastic wave receiving means dispersed on the focal curve of said array of elastic wave transmitting means, for producing focused elastic wave arrival data traces corresponding to appearances of the elastic waves at the receiving means; and data adjusting means for adjusting properties of said focused wave arrival data traces relative to each other, to provide a spatially classified processing of the seismic data.

10. A system for processing seismic data, which comprises:

move-out correcting means for applying move-out corrections to seismic data traces from an array of seismic receiving stations;

electronic means connected to receive as an input the move-out corrected seismic data traces and effective for producing physical quantities that stimulate amplitude-with-time data traces of appearances of elastic waves at receiving locations, such simulated data traces corresponding to those produced by elastic waves that are related to said move-out corrected seismic data traces being transmitted from an array of points dispersed on a curve in a one-to-one mapping of the dispersion of said seismic receiving stations and received at an array of reception points on the focal curve of the curve of said transmission points; and electronic data modifying means for modifying properties of said physical quantities relative to each other.

11. The system of claim 10 wherein said data modifying means includes means for producing a visible display of said physical quantities with said amplitudes with time appearing along time axes that are inclined relative to each other at the angles along which said elastic waves are focused by said transmissions and receptions.

12. The system of claim 10 wherein said data modifying means includes means for summing a plurality of batches of said physical quantities corresponding to appearances of said transmitted and received elastic waves.

13. The system of claim 10 wherein said means for producing physical quantities and said data modifying means are inclusive of digital computer means.

* * * * *